United States Patent [19]
Khetani

[11] 3,720,339
[45] March 13, 1973

[54] PLASTIC CONTAINER FOR PRESSURIZED MATERIALS-A

[75] Inventor: Bhupendra N. Khetani, Vernon, Conn.

[73] Assignee: Monsanto Company, St. Louis, Mo.

[22] Filed: Sept. 24, 1970

[21] Appl. No.: 75,094

[52] U.S. Cl. ................................................215/1 C
[51] Int. Cl. .............................................B65d 1/02
[58] Field of Search ...........................215/1 R, 1 C

[56] References Cited

UNITED STATES PATENTS

| | | | |
|---|---|---|---|
| 3,511,401 | 5/1970 | Lachner | 215/1 C |
| 3,029,963 | 4/1962 | Evers | 215/1 C |
| 3,426,102 | 2/1969 | Solak et al. | 210/879 |

FOREIGN PATENTS OR APPLICATIONS

| | | | |
|---|---|---|---|
| 1,175,048 | 12/1969 | Great Britain | 215/1 C |
| 1,432,147 | 2/1969 | Germany | 215/1 C |
| 6,709,675 | 1/1968 | Netherlands | 215/1 C |

Primary Examiner—Joseph R. Leclair
Assistant Examiner—Stephen Marcus
Attorney—James C. Logomasini, Michael J. Murphy and Neal E. Willis

[57] ABSTRACT

A plastic container such as a bottle for pressurized fluent materials having a specially designed lower body portion which minimizes areas of high stress concentration generated as a result of the pressure of the contents, yet is configured such that the container is self supporting on a horizontal surface without an auxiliary part. The shape of the lower body portion is that of a modified hemisphere wherein a segmented hemispherical surface tangentially blends into an intermediate portion, the center of which defines a seating ring for the container, the radius of curvature of the intermediate portion being such that the diameter of the seating ring is between 25 to 80 percent of the diameter of the container body immediately adjacent the lower body portion. A convex central base portion is tangential to the other end of the intermediate portion. The container is preferably formed from a high tensile strength polymer, the major component of which is polymerized from a monomer having one or more nitrile groups in its molecular structure.

6 Claims, 7 Drawing Figures

INVENTOR
BHUPENDRA N. KHETANI
BY
Michael J. Murphy
ATTORNEY

--- σ_T (HOOP STRESS)
—— σ_IJ (AXIAL STRESS)

INVENTOR.
BHUPENDRA N. KHETANI
BY Michael J. Murphy
ATTORNEY

PLASTIC CONTAINER FOR PRESSURIZED MATERIALS-A

BACKGROUND OF THE INVENTION

This invention relates to a plastic container and more particularly to a thermoplastic bottle having a lower body portion configured to minimize areas of high stress concentration present as a result of the pressure of the contents.

Thermoplastic containers such as bottles for holding pressurized fluent materials, e.g., carbonated beverages, beer and the like, have been appearing recently in the marketplace in competition with the more traditional glass containers for such materials. These thermoplastic bottles have high consumer preference since, generally speaking, in comparison with glass they are more break resistant, are more compatible with solutions to current ecological problems in the sense of being readily incineratable, are lighter in weight and are consequently relatively easy to handle.

The design pressure for such containers, however, can be as great as from 200 to 300 psi when suitable safety factors are included. The stresses generated on the walls of such containers as a result of these pressures are accordingly quite substantial. For example, in the sidewall area there is present a hoop or circumferential stress acting normal to the container axis as well as an axial stress acting parallel to the bottle axis. Similar circumferential and axial stresses act on the bottom wall in the base area of the container. These stresses are vectorally additive and the total stress represents a tremendous concentration in the bottom portion of the container, particularly in the area of the junction of the sidewall with the base. A raised bottom projecting into the body is usually used in containers of this type and this creates yet an additional stress because of the tendency of such a shape to pop outwardly as a result of the internal pressure.

It is possible to provide the bottle with sufficient strength to withstand these stresses by increasing the wall thickness in the areas of high stress concentration and this is the approach which has been utilized in the past by the glass industry. However, for a plastic bottle, the family of plastics which qualify for use in containers of this type are rather selective since not only should they be extrudable and moldable by conventional techniques, but they must also possess many chemical properties which make them compatible with the packaged contents, such as a relatively low permeability to liquids and gases, high heat distortion temperature, and, when applicable, little or no taste transfer. Probably most important, however, is the requirement of sufficient tensile strength to withstand the pressures generated. Polymers having such a wide variety of properties are costly to synthesize and, needless to say, must be used as sparingly as possible in each article if it is to be economically competitive.

However, if it is desirable to pursue this approach of increasing wall thickness in specific areas, it can be done via known techniques. For example, when the container is formed by expanding a tubular parison against internal walls of a blow mold, the wall thickness of the parison may be selectively increased in those area(s) which correspond to the places in the finished article subject to high stress. This technique is known as programming and generally requires rather sophisticated equipment, one form of which is described in copending application Ser. No. 639,686, filed May 19, 1967, and assigned to the assignee of the present invention.

A more desirable alternative approach toward providing a container such as a bottle with sufficient strength to hold pressurized fluent materials is to develop a shape, especially in the areas prone to high stress concentration, which minimizes developed stresses because of its surface contour. Accordingly, it is known that a bottle having a base in the shape of a hemisphere provides the optimum shape for minimum stress build-up, since the surface area per unit volume is smaller than any other base design. Stress analysis of such a shape, as will be subsequently described in more detail, has even shown that stresses in the bottle sidewall exceed those in the hemispherical base for a given internal pressure. Such a bottle, however, because of the shape of its base requires an auxiliary holder to support it on a horizontal surface, and such an integral holder has been disclosed in the prior art. However, in addition to such a package representing a rather radical departure in appearance from conventional shapes to which the public has become accustomed, the separate support member and processing step for attaching it to a bottle, (or in certain cases the special mold design to form it when it is integral with the container) undesirably increase the cost of producing such a composite package.

SUMMARY OF THE INVENTION

Now, however, there has been developed a configuration for the bottom portion of a thermoplastic container for holding pressurized fluent materials which minimizes stress yet has the same general overall appearance of other consumer oriented containers previously used for such contents.

Accordingly, it is a principal object of this invention to provide a low stress container design for holding pressurized fluent materials.

Another object of this invention is to provide a lower body configuration in a bottle for holding pressurized fluent materials which minimizes areas of high stress occurring as a result of the pressure of the contents.

Another object of this invention is to provide a bottle for holding pressurized beverages which is capable of withstanding internal pressures of from 200–300 psi or more and which is formed from a class of special high tensile strength thermoplastics.

Another object of this invention is to provide a bottle of the type described wherein a minimum amount of the special thermoplastic is used therein.

An additional object of this invention is to provide a thermoplastic bottle of the type described which is not radically different in overall appearance from conventional bottles previously used for the same purpose but formed of different materials.

A further object of this invention is to provide a bottle of the type described which may be shaped by conventional blow molding techniques and which, because of the configuration of the bottom section of the bottle, is automatically reinforced during expansion in the blow mold without requiring a corresponding increase in the wall thickness of the parison from which the bottle is formed.

Other objects of this invention will in part be obvious and will in part appear hereinafter.

These and other objects are accomplished by providing a thermoplastic container, preferably a bottle, for pressurized fluent materials comprising a generally cylindrical sidewall portion having an opening at its upper end. In the case of a bottle, the upper end of the sidewall smoothly merges into a neck portion adjacent this opening. The container has a bottom portion at the other end of the sidewall portion having a modified hemispherical shape, said bottom portion comprising a lower sidewall portion in the form of a hemispherical segment, a convex central base portion and a curved intermediate portion interconnecting the convex base portion with the lower sidewall portion, the radius of curvature of the intermediate portion being such that it is tangential at one end with the convex base and tangential at the other end with the hemispherical segment, a section of the surface of the intermediate portion centered between said tangential points defining a seating ring for supporting the container on a horizontal surface, the diameter of the ring being between 25 to 80 percent of the diameter of the generally cylindrical upper sidewall portion immediately adjacent the bottom portion.

The thermoplastic polymer from which the bottle is formed preferably has a major constituent therein which has been polymerized from a monomer having one or more nitrile groups in its molecular structure.

BRIEF DESCRIPTION OF THE DRAWINGS

In describing the overall invention, reference will be made to the accompanying drawings in which.

DETAILED DESCRIPTION OF THE INVENTION

Figure 1:
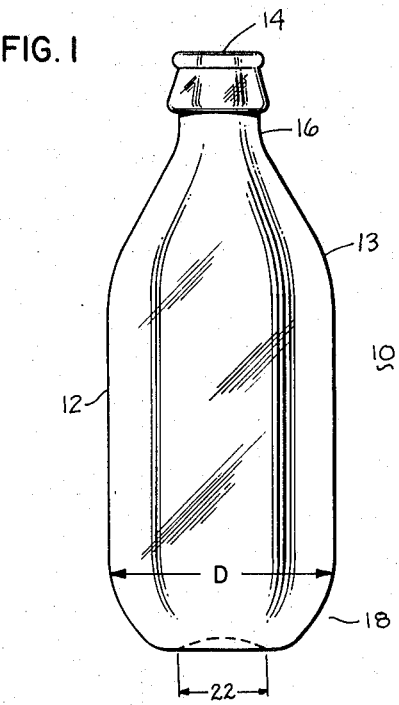
FIG. 1 is an elevational view of a bottle embodying the design of the present invention.
Figure 5:
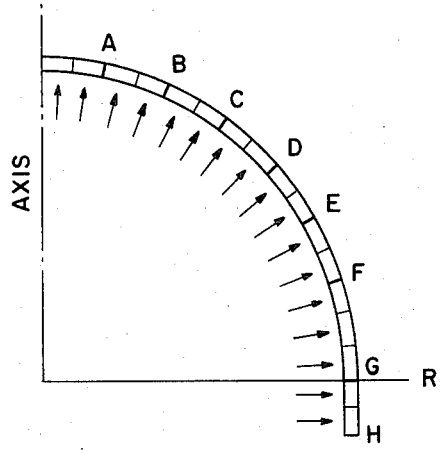
FIG. 5 is a view similar to FIG. 2 of a bottle having a full hemispherical bottom configuration.

Referring now to the drawings, there is illustrated in FIG. 1, a thermoplastic container 10 for pressurized fluent materials such as carbonated beverages, beer, aerosols and the like. Container 10 has a generally cylindrical sidewall portion 12 with an opening 14 at its upper end over which must be secured a suitable conventional pressure resistant cover member (not shown) e.g., a crown closure. Though a container having a constant cross section along sidewall portion 12 is illustrated, it should be understood that a cross section varying anywhere along the length is likewise within the scope of the invention. In the illustrated embodiment, the container is a bottle and the upper sidewall portion or shoulder 13 smoothly merges into a neck portion 16 adjacent opening 14. Container or bottle 10 has a bottom portion at the other end of sidewall portion 12, generally depicted as 18 and made up of a series of three interconnected wall portions. Bottom portion 18 has the shape of a modified hemisphere and comprises lower sidewall portion 20 (FIG. 2) in the form of a segment of a hemisphere having a radius equal to ½ D and which if continued uninterrupted would be truly hemispherical in contour as illustrated in FIG. 5. Bottom portion 18 further includes a convex central base portion 22 and a curved intermediate portion 24 interconnecting convex base portion 22 with lower sidewall portion 20. The radius of curvature of intermediate portion 24 as well as that of portions 20 and 22 is such that portion 24 is tangential at one end 26 with convex portion 22 and tangential at the other end 28 with hemispherical segment 20. The radius of curvature of intermediate portion 24 is less than that of hemispherical segment 20 yet equal to or greater than 25 percent of the radius of curvature of said hemispherical segment. In other words, the radius of curvature of intermediate portion 24 preferably is between 25 to 70 percent of that of hemispherical segment 20. A section 30 of the outer surface of intermediate portion 24 centered between tangential points 26 and 28 defines a seating ring for supporting bottle 10 on a horizontal surface. To provide the required degree of stability in a lateral direction for a relatively elongated container such as bottle 10, the diameter of the seating ring must be between 25 to 80 percent of the diameter D of generally cylindrical sidewall portion 12, with reference diameter D considered to be the diameter of the sidewall immediately adjacent to and above the upper end of bottom portion 18. At seating ring diameters in excess of 80 percent, intermediate portion 24 presents too abrupt a change in contour and consequently the stress distribution thereat is excessive, whereas at seating ring diameters less than 25 percent of reference diameter D, the bottle is too unstable for general use and tends to topple on its side during handling for the range of diameters D generally encountered in commercial use. For containers of the type within the scope of the present invention, the preferred radii of curvature of (a) hemispherical segment 20 is between ¼ to 2½ inches, (b) convex central base portion 22 is between ½ to 20 inches, and (c) intermediate portion 24 is between 1/16 to 1.75 inches. In a particularly preferred embodiment, the radius of curvature of hemispherical segment 20 is equal to one-half the diameter D of bottle 10.

Figure 2:
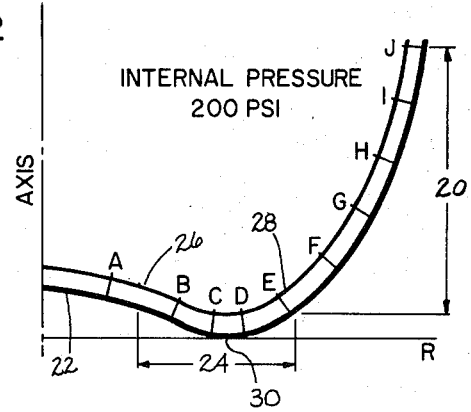
FIG. 2 is a schematic diagram on an enlarged scale of the lower body portion of the bottle of FIG. 1.
Figure 3:
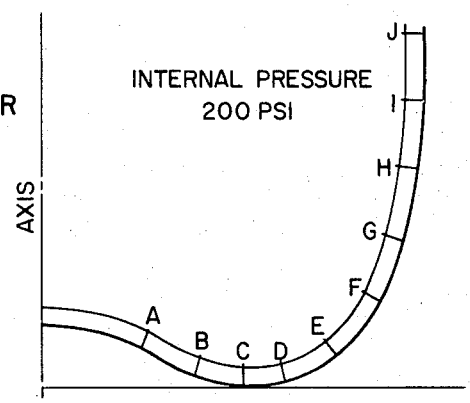
FIG. 3 is a view similar to FIG. 2 of the lower body portion of a related prior art bottle.
Figure 4:
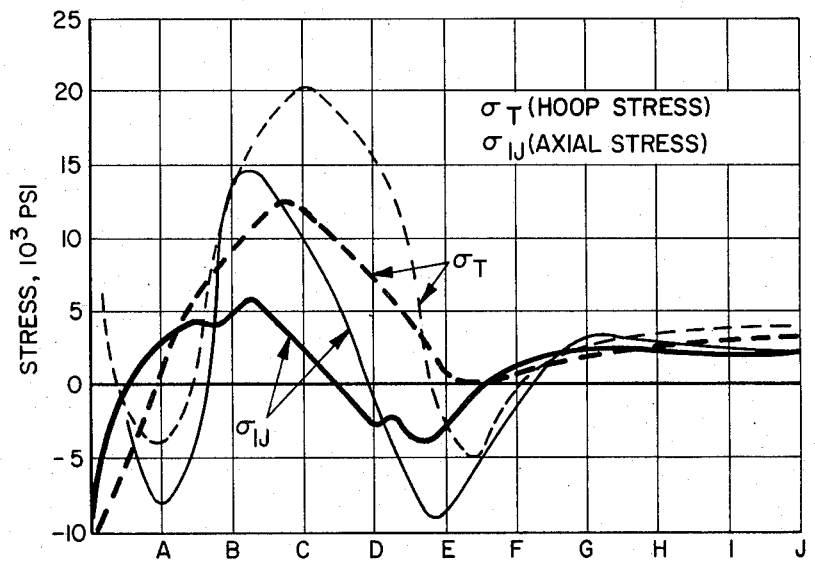
FIG. 4 is a graph illustrating stress values present at various points along the bottle body portions of FIGS. 2 and 3, the letters shown along the abscissa corresponding to the points bearing the same letters in FIGS. 2 and 3.

Turning now to an analysis of the principal stresses generated in lower body portion 18 of container 10, FIG. 4 illustrates the values of these stresses in graph form, $\sigma_T$ symbolizing the stress in the hoop or circumferential direction, i.e., normal to the axis of bottle 10 and $\sigma_U$ symbolizing the stress generated parallel to the bottle axis. The letters along the abscissa correspond to the points along the constant thickness lower portion of the bottle body as illustrated in FIGS. 2 and 3. The curves in heavy solid and dashed lines represent values for the bottle of FIG. 2, whereas the similar curves in lighter phantom lines represent values for a prior art bottle illustrated in FIG. 3 and to be discussed further hereafter. Negative values on the graph of FIG. 4, for example in the general area of portion A, mean that that particular portion of the container surface is under compression rather than tension as is the case in most of the remainder of the lower body portion. The values are those calculated as occurring below and immediately adjacent the outer surface of the container wall, as opposed to those present on the inner surface or part way through the wall, these latter stresses, at least with respect to the hoop stress, having been found to be less than and therefore not as critical as those occurring on the outer surface of the container.

As can be seen from FIG. 4, the stresses in the general area of intermediate portion 24, or in the lettered area from slightly to the left of B to lettered area E, are quite substantial in comparison with those existing from area E through J, the hoop stress tending to be greater than the axial stress $\sigma_U$ and reaching at point C as just as about 12,000 psi. Thus, in the illustrated instances, which may be somewhat severe at an applied pressure of 200 psi in comparison with the pressures encountered in normal commercial situations, the thermoplastic material from which bottle 10 is fabricated must have a tensile strength of some 12,000 psi for the thickness used in obtaining the value in order to withstand the applied 200 psi internal pressure, or else it becomes necessary to add additional material into this portion of the container wall to provide it with sufficient strength in these areas.

Figure 6:
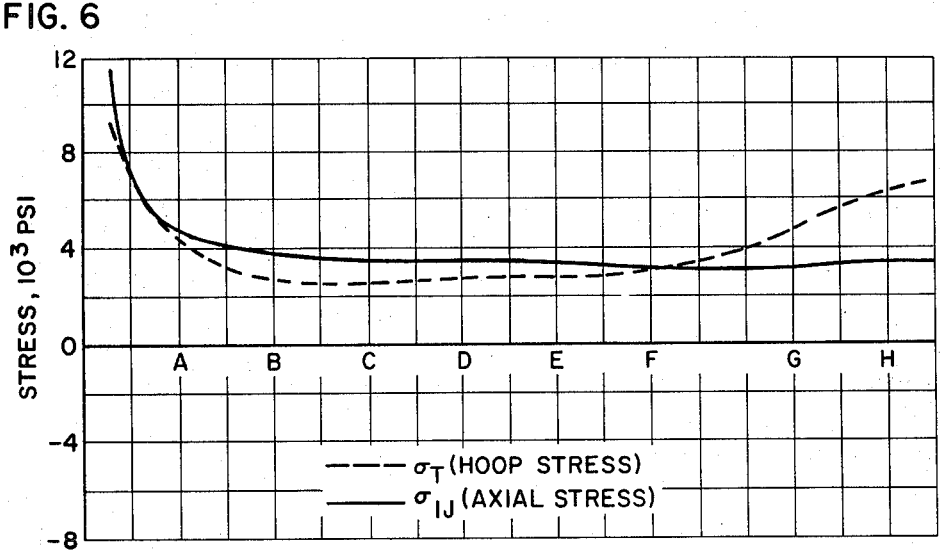
FIG. 6 is a graph similar to that of FIG. 4 illustrating stress values present at the various lettered points in FIG. 5.

In FIG. 5, there is depicted a view of the bottom portion of a fully hemispherical base design and a plot of the stresses occuring along such a surface is depicted in FIG. 6. As can be seen, all areas are under tension, and are generally uniform and less than those present in portion 18 of bottle 10 (FIG. 4). Thus, as previously indicated, the full hemispherical base configuration provides the optimum distribution of stresses in the base portion of a container, yet a container having such a bottom configuration will not, of course, remain in an upright position on a flat surface without an auxiliary support. Contrasting this with FIG. 4, it can be seen that the concept of the design of the present invention lies in retaining the hemispherical configuration for as great a portion of the lower body section as possible, i.e., up to tangential point E or 28, and then utilizing a single intermediate portion which acts as a seating ring for the container and blends into a convex base portion. This latter portion 22, as mentioned, is necessary for purposes of both bottle stability and stress minimization. In other words, a flat surface has been found to produce a much poorer stress distribution profile in the sense of having greater values than that of the illustrated convex configuration, and also has been found to cause the bottle to rock laterally because of slight outward bulging as a result of stresses of the type illustrated as being present in the area in FIG. 4. Accordingly, with the configuration of the present invention as illustrated in FIG. 2, stresses in the area BC of intermediate portion 24 reach about 12,000 psi at an applied internal pressure of 200 psi yet these stresses drop off rather rapidly thereafter and level out at G to those generally occurring in a full hemispherical base configuration.

Figure 7:
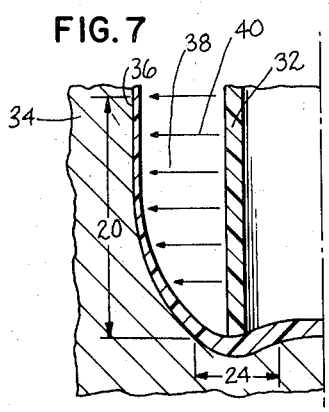
FIG. 7 is a schematic view of a thermoplastic parison enclosed within a mold having wall sections conforming to the shape of the bottom portion of the bottle of FIG. 1.

There is schematically illustrated in FIG. 7 a typical procedure well-known to those in the bottle forming art for shaping article 10, and in which the particular lower body configuration of the present invention has unique application. Thus, parison 32 which has been extruded through the annular outlet opening of an extrusion head with a generally uniform wall thickness appears in FIG. 7 enclosed within partible halves of a blow mold, one half of which is illustrated as 34. In order to form lower body portion 18 as well as the rest of the container, tubular parison 32 is conventionally expanded outwardly against article defining surface 36 of the blow mold. Since space 38 (in which arrows 40 are depicted) identified as that between parison 32 prior to blowing and surface 36, generally decreases toward the mold surface defining intermediate portion 24 of the article, the parison will move outwardly or expand less in reaching the mold surface defining high stress intermediate portion 24 than it does in reaching the mold surface defining hemispherical segment portion 20 and the upper sidewall area wherein space 38 is greater. Consequently the wall thickness in intermediate portion 24 will be incrementally greater than that of hemispherical segment portion 20. Thus, the thickness at the critical intermediate portion 24 of the lower body will be inherently and automatically increased during blow molding over that occurring in immediately adjacent upper areas of the container. Therefore, though it may be used if it is desired to substantially increase wall thickness, no special provisions need be made or equipment provided for programming or selectively increasing the wall thickness of the parison prior to blowing as a result of the configuration of the present invention. However, if the thickness is greater than necessary for a given service pressure, such a programming technique can be used to decrease the wall thickness of the parison prior to blowing, in order to compensate for the inherent thickness increase which will occur during expansion as previously described. Needless to say, the same thickness increase phenomenon will occur should container 10 be blown or pulled away from the surface of a forming plug in a thermoforming operation, since the surface of the mold cavity in order to define the lower body shape will be identical to that depicted in FIG. 7.

RELATED PRIOR ART

For purposes of comparing the stress minimizing lower body configuration of the container of the present invention with that of a related prior art configuration as disclosed in U.S. Pat. No. 3,511,401, hoop and axial stresses were calculated for this latter configuration in the same manner as for those of the present invention. To provide a realistic comparison, all parameters, i.e., type of material, wall thickness, moduli, applied loading pressure and diameter D were held equal in each case except for the different surface configuration. For those portions of the surface configuration of the prior art container for which ranges were give, mid points were utilized. As can be seen in FIG. 4, a comparison of the light or phantom lines thereon which correspond to the lettered points in FIG. 3 of the prior art design, with the previously discussed darker plots which relate to the FIG. 2 design of the present invention, stresses at all points are greater or more severe in the lower body portion of the prior art design than that of the present invention. Also, in view of the 20,000 psi stress occurring at C with this prior art design, a thermoplastic having a tensile strength at least equivalent to this would have to be used with a 200 psi internal pressure condition, or else proportionately more material would have to be added to this portion of the bottle wall than that necessary with the configuration of the present invention.

The above description and particularly the drawings are set forth for purposes of illustration only and are not to be taken in a limited sense.

The modified hemispherical lower body configuration of the present invention may be utilized on both elongated narrow neck bottle type and wide mouth can type pressurized containers, since in each case the maximum stresses occur in the lower portion of the container rather than along the sidewalls. Though the bottom design may be utilized with a wide variety of sizes, it is particularly applicable to sizes which may be hand held for purposes, for example, of drinking or dispensing of the contents, and for such sizes the diameter of the body in the generally cylindrical central hand holding section should be between ½ to 5 inches.

The container of the present invention must be formed from a relatively high strength thermoplastic in order to be capable of withstanding the stresses generated thereon as a result of the pressurized contents. This thermoplastic should be capable of being shaped by conventional molding techniques, e.g., by direct injection molding, by extrusion blow molding by thermoforming, i.e., drawing from sheet material, by spin welding previously molded parts together or by combinations of these techniques. The preferred technique is by expanding either a tubular preform outwardly against walls of a blow mold or by expanding a sheet drawn into a die cavity by means of a plug outwardly against the walls of said cavity in a thermoforming operation. With either of these latter techniques, the highly stressed intermediate portion of the modified hemispherical bottom is automatically incrementally increased in thickness over that in surrounding areas as a result of the reduced distance between the wall of the mold and the thermoplastic preform over that in other areas of the container defining mold surface.

Though the thermoplastic can be selected from a wide range of polymeric materials including vinyl polymers, the major component of the high strength thermoplastic polymer from which the container of the invention is fabricated must have been polymerized from a monomer containing at least one nitrile group (—CN) in its molecular structure. This nitrile bearing polymerized monomer should be present at a level of from between 51 to 98 weight percent in the polymer in order to provide the container with the combination of chemical and physical properties which necessarily must be present in the thermoplastic in order that it be an effective material for packaging pressurized fluent materials such as carbonated beverages, beer, aerosols, etc. In addition to low oxygen and water vapor permeability values, this family of thermoplastics exhibits resistance to failure by high speed impact and has a tensile strength value in excess of 8,000 psi, i.e., between 9,000 to 12,000 psi.

Typical of the materials suitable for use as the thermoplastic from which the container of the present invention may be formed are, for example, acrylonitrile, ethacrylonitrile, propacrylonitrile, alphachloroacrylonitrile, alpha-bromoacrylonitrile, alpha-fluoroacrylonitrile, alpha-cyano-styrene, vinylidene cyanide, alpha-cyano acrylic acids, alpha-cyano acrylates such as alpha-cyano methyl acrylates, alpha-cyano ethyl acrylates, and the like, 2,3-dicyanobutene-2, 1,2-dicyanopropene-1, alpha-methylene glutaronitrile, and the like. The preferred monomer for this purpose is methacrylonitrile.

Any monomer or monomers which are copolymerizable with the nitrile group containing component of the polymer may be employed in the practice of this invention. Exemplary of such monomers are ethylenically unsaturated aromatic compounds such as styrene, alpha-methyl styrene, ortho-, meta-, and para-substituted alkyl styrenes, e.g., ortho-methyl styrene, ortho-ethyl styrene, para-methyl styrene, para-ethyl styrene, ortho-, meta-, or para- propyl styrene, ortho-, meta-, or para-isopropyl styrene, ortho-, meta, para-butyl styrene, ortho-, meta-, or para-secondary butyl styrene, ortho-, meta-, or para- tertiary butyl styrene, etc., alpha-halogenated styrene, e.g., alpha-chlorostyrene, alpha-bromostyrene, ring-substituted halogenated styrenes, e.g., ortho-chlorostyrene, para-chlorostyrene, and the like; esters of ethylenically unsaturated carboxylic acids e.g., methyl acrylate, methyl methacrylate, ethyl methacrylate, ethyl acrylate, butylacrylate, propyl acrylate, butyl methacrylate, glycidol acrylate, glycidol methacrylate, and the like, ethylenically unsaturated acids, carboxylic acids such as acrylic acid, methacrylic acid, propacrylic acid, crotonic acid, critaconic acid, and the like. Vinyl esters, e.g., vinyl formate, vinyl acetate, vinyl propionate, vinyl butyrate, etc.; vinyl and vinylidene halides, e.g., vinyl chloride, vinyl bromides, vinylidene chloride, vinylidene chloride, vinyl fluorides, etc.; vinyl ethers, e.g., methyl vinyl ether, ethyl vinyl ether, alpha-olefins, olefins, e.g., ethylene, propylene, butene, pentene, hexene, heptene, oxtene, isobutene, and other isomers thereof.

This invention also contemplates the use of synthetic or natural rubber components such as, for example, polybutadiene, butadiene-styrene copolymers, isoprene, neoprene, nitrile rubbers, acrylate rubbers, natural rubbers, interpolymers of butadiene with acrylonitrile, methacrylonitrile, tertiary butyl styrene, styrene and mixtures thereof such as acrylonitrile-butadiene copolymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitrile-tertiarybutyl styrene-butadiene terpolymers, ethylene-propylene copolymers, chlorinated rubbers, etc., which may be used to strengthen or toughen the materials prepared from the compositions of this invention. This rubbery component may be incorporated into the polymers of this invention by any of the methods which are well known to those skilled in the art, e.g., direct polymerization of monomers, polyblends, grafting the monomer mixture onto the rubbery backbone, physical admixture of the rubbery component, etc.

Various modifications and alterations will be readily suggested to persons skilled in the art. It is intended, therefore, that the foregoing be considered as exemplary only and that the scope of the invention be ascertained from the following claims.

What is claimed is:

1. A thermoplastic container for pressurized fluent materials comprising:
   a. a generally cylindrical sidewall portion having an opening at its upper end;
   b. a bottom portion at the other end of said sidewall portion having a modified hemispherical shape, said bottom portion comprising a lower sidewall portion in the form of a hemispherical segment of constant radius, a convex central base portion and a curved intermediate portion interconnecting said convex base portion with said lower sidewall portion, the radius of curvature of said intermediate portion being such that it is tangential at one end with the convex base and tangential at the other end with the hemispherical segment, said radius of curvature of the intermediate portion being 25 to 70 percent of the radius of curvature of said hemispherical segment, a section of the surface of said intermediate portion centered between said tangential points defining a seating ring for supporting said bottle on a horizontal surface, the diameter of said ring being between 25 to 80 percent of the diameter of the generally cylindrical sidewall portion immediately adjacent the bottom portion.

2. The container of claim 1 wherein the thermoplastic is a polymer, the major component of which is formed from a monomer having at least one nitrile group in its molecular structure plus at least one other monomer copolymerized therewith.

3. The container of claim 2 wherein the amount of the major component in the polymer is between 51 to 98 percent by weight.

4. The container of claim 3 wherein the major component in the polymer is polymerized methacrylonitrile.

5. The bottle of claim 1 wherein the radii of curvature of
   a. the hemispherical segment is between ¼ to 2½ inches,
   b. the convex central base portion is between ½ to 20 inches and
   c. the intermediate portion is between 1/16 to 1.75 inches.

6. The bottle of claim 1 wherein the radius of curvature of the hemispherical segment is equal to one half the diameter of the bottle immediately adjacent the bottom portion.

* * * * *